United States Patent
Fukuroi et al.

(10) Patent No.: US 7,392,580 B2
(45) Date of Patent: Jul. 1, 2008

(54) METHOD FOR MANUFACTURING A SLIDER USING ELECTROMAGNETIC WAVE

(75) Inventors: Osamu Fukuroi, Hong Kong (CN); Ryuta Murakoshi, Hong Kong (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 7 days.

(21) Appl. No.: 11/507,018

(22) Filed: Aug. 21, 2006

(65) Prior Publication Data
US 2007/0044298 A1 Mar. 1, 2007

(30) Foreign Application Priority Data
Aug. 26, 2005 (JP) .............................. 2005-245670

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/65; 360/235.1; 360/235.3; 360/235.8; 360/236.1; 360/236.3; 360/246.2; 451/5; 451/41

(58) Field of Classification Search ................... 29/417, 29/603.13–603.16, 63.18; 216/22, 39, 41, 216/48, 65; 360/235.1, 235.3, 235.7, 235.8, 360/236.1, 236.3, 246.2; 451/5, 41
See application file for complete search history.

(56) References Cited

U.S. PATENT DOCUMENTS 5,755,612 A * 5/1998 Schaenzer et al. .............. 451/5

6,531,084 B1 * 3/2003 Strom et al. ................. 264/400
2006/0027542 A1 * 2/2006 Mahadev et al. ........ 216/121.67

FOREIGN PATENT DOCUMENTS

| JP | 04289511 A | * 10/1992 |
|---|---|---|
| JP | 5-334643 | 12/1993 |
| JP | 6-84312 | 3/1994 |
| JP | 8-203051 | 8/1996 |
| JP | 11-110934 | 4/1999 |
| JP | 11-213368 | 8/1999 |
| JP | 2000-3570 | 1/2000 |

* cited by examiner

*Primary Examiner*—Paul D. Kim
(74) *Attorney, Agent, or Firm*—Nixon & Vanderhye P.C.

(57) ABSTRACT

A method for manufacturing sliders from a bar has: a radiating step which includes radiating an electromagnetic wave on at least a part of each space on a second surface of said bar, wherein said second surface is a back surface of a first surface of said bar, said first surface being formed into an air bearing surface of said slider, wherein said space is sandwiched between said elements, and wherein said electromagnetic wave is radiated such that an entire portion of said bar forms a curved shape such that said first surface forms a convex surface; a lapping step of lapping said first surface while pressing said bar against a lapping surface such that said first surface of each element forms a concave shape; and a dicing step of dicing said bar along said spaces to separate said bar into said sliders.

7 Claims, 6 Drawing Sheets

METHOD FOR MANUFACTURING A SLIDER USING ELECTROMAGNETIC WAVE

The present application is based on, and claims priority from, J.P. Application No. 2005-245670, filed on Aug. 26, 2005, the disclosure of which is hereby incorporated by reference herein in its entirety.

BACKGROUND OF THE INVENTION

1. Field of the Invention

The present invention relates to a method for manufacturing a slider that is used for a hard disk drive, and particularly relates to a method for forming a camber on the air bearing surface of a slider.

2. Description of the Related Art

A hard disk drive, which is a recording medium that is high-speed, large-capacity, high-reliability and low-cost, is widely used for recording digital information. The hard disk drive has a magnetic head slider (referred to as a slider hereafter) that is provided with at least either of a write head portion for writing information to a recording medium and a read head portion for reading information from the recording medium. A read/write portion, which merges the write head portion and the read head portion, is arranged at one end of the slider. The surface of the slider that is opposite to the recording medium is called an ABS (air bearing surface).

The air bearing surface (ABS) has rail-like protrusions in order to improve flying characteristics and operating characteristics of the slider. Further, the air bearing surface is often formed into a curved surface called a crown and a camber. The crown is a curved surface in a plane that includes the depth direction (the direction along which air flows) of a slider. The camber is a curved surface in a plane that includes the width direction (the direction that is orthogonal to the direction along which the air flows) of a slider.

A lot of methods for forming the camber, which is the subject matter of the present invention, have been disclosed. Japanese Patent Laid-Open Publication No. 84312/94 (Patent Document 1) discloses a method for forming a camber in a predetermined shape by radiating laser on an element that is to be formed into a slider. Residual stress is caused in the element by forming rails and lapping the slider. The camber is formed in a predetermined shape by radiating laser on the slider from the side that is opposite to the air bearing surface, and thereby selectively removing the surface layer of the opposite surface to change the stress state of the element.

Japanese Patent Laid-Open Publication No. 110934/99 (Patent Document 2) discloses a method for forming a camber in a predetermined shape by blasting micro particles that are made of hard material onto a bar at a high speed, while protecting rails, which are formed on the air bearing surface, with a resist film for ion-milling, thereby causing compressive stress in the surface layer of the air bearing surface other than the rails.

Japanese Patent Laid-Open Publication No. 2000-3570 (Patent Document 3) discloses a process of forming grooves in a predetermined shape on a surface of a bar that is to be formed into the air bearing surface, and lapping the bar by pressing the bar against a plate having a curved surface. Since the grooves formed on the bar open and the bar bends when the bar is pressed against the lapping plate, a camber is formed with a desired curvature according to the curvature of the lapping plate.

Japanese Patent Laid-Open Publication No. 213368/99 (Patent Document 4) discloses a process of bonding a slider to a jig having a concave curved shape using an adhesive on the back surface of a surface that is to be formed into the air bearing surface, deforming the slider in a curved shape by curing the adhesive, and lapping the surface flat that is to be formed into the air bearing surface. When lapping is finished and the slider is removed from the jig, the adhesive force is released, and a camber having a predetermined curvature is formed on the air bearing surface.

Japanese Patent Laid-Open Publication No. 203051/96 (Patent Document 5) discloses a method for lapping a bar by pressing the bar against a lapping surface whose height differs at an inner peripheral portion and at an outer peripheral portion. The bar is formed in a spherical shape that extends from the inner peripheral portion to the outer peripheral portion.

Japanese Patent Laid-Open Publication No. 334643/93 (Patent Document 6) discloses a process of forming micro grooves called scribed lines which extend on the air bearing surface except for rails in a longitudinal direction of the slider. The mechanical stress, which is generated when the scribed lines are formed, makes the machining marks open on both sides thereof, and the air bearing surface is deformed in a curved shape having a camber.

In the techniques which are described in Patent Documents 2 to 6, a slider is directly machined or a lapping plate having a specific surface is used in order to form a camber. In recent years, as a hard disk drive is miniaturized in order to mount the hard disk drive on a cellular phone etc., the slider itself is miniaturized from a conventional 30-percent slider (a slider having a dimension of approximately 1.0 mm×1.235 mm×0.3 mm) to a 20-percent slider (a slider having a dimension of approximately 0.7 mm×0.85 mm×0.23 mm) and a further miniaturization has been studied. Further, a flying height has been becoming smaller and smaller in recent years, because reduction in the flying height of a slider is effective for increasing recording density of a recording medium. In order to meet those requirements, accuracy in machining operation and the lapping surface need to be enhanced in accordance with the size and flying height of a slider. However, these methods, such as machining a slider, have their limitation and may worsen the cost and yield of the product.

The technique described in Patent Document 1, which utilizes a quite different principle, i.e. radiation of laser, is less restrictive to the requirement for miniaturization and reduction in the flying height of a slider. However, there is a problem that the stress state (compressive stress) that is generated by the radiation of laser tends to be released during inspections in the manufacturing process of a hard disk or by thermal shocks during operation of the hard disk, leading to a worsened reliability for the stability of the shape.

SUMMARY OF THE INVENTION

An object of the present invention is to provide a method for manufacturing a slider that enables the formation of a camber having high stability of the shape in an economical manner and with a high accuracy.

According to the present invention, a method for manufacturing sliders from a bar, wherein elements and spaces are alternately arranged in the bar, the elements being formed into the sliders, and the spaces being used to dice the bar into the sliders is provided. The method comprises: a radiating step which includes radiating an electromagnetic wave on at least a part of each space on a second surface of the bar, wherein the second surface is a back surface of a first surface of the bar, the first surface being formed into an air bearing surface of the slider, wherein the space is sandwiched between the elements, and wherein the electromagnetic wave is radiated such that an entire portion of the bar forms a curved shape such that the first surface forms a convex surface; a lapping step that is performed after the radiating step, the lapping step including lapping the first surface while pressing the bar against a lapping surface such that the first surface of each element forms a concave shape; and a dicing step that is performed after the lapping step, the dicing step including dicing the bar along the spaces to separate the bar into the sliders.

Compressive stresses are caused in each of the irradiated spaces on the side of the second surface by radiating an electromagnetic wave on the spaces of the second surface, and each of the spaces on the side of the second surface shrinks. Consequently, the bar bends such that the first surface forms a convex surface. The bar is deformed to return to the original shape. As a result, each of the first surfaces of the element forms a concave surface. The bar is lapped in this state while pressed against a lapping surface. Each element is lapped at both ends first and the area of lapping expands to the central portion as the lapping progresses. In other words, the bar is lapped such that both ends of each element are lapped by the largest amount and the central portion is lapped by the smallest amount. In this way, a camber having a convex central portion is formed on each element.

According to the present invention, the shape of a camber is controlled by properly selecting the amount of radiation and the wavelength of the electromagnetic wave and thereby adjusting the curvature. Therefore, it is not necessary to prepare any jigs etc. for each slider or for each camber shape. Also machining accuracy is high. Since electromagnetic wave is radiated on the space of the bar, but is not or little radiated on the slider, the compressive stress is not generated on the slider by the laser. Therefore, there is little possibility that stability of the camber shape is deteriorated due to the release of the compressive stress caused by thermal shocks. Accordingly, it is possible to form a camber having high stability of the shape in an economical manner and with a high accuracy.

The above and other objects, features and advantages of the present invention will become apparent from the following description with reference to the accompanying drawings which illustrate examples of the present invention.

DETAILED DESCRIPTION OF THE INVENTION

Figure 1A:
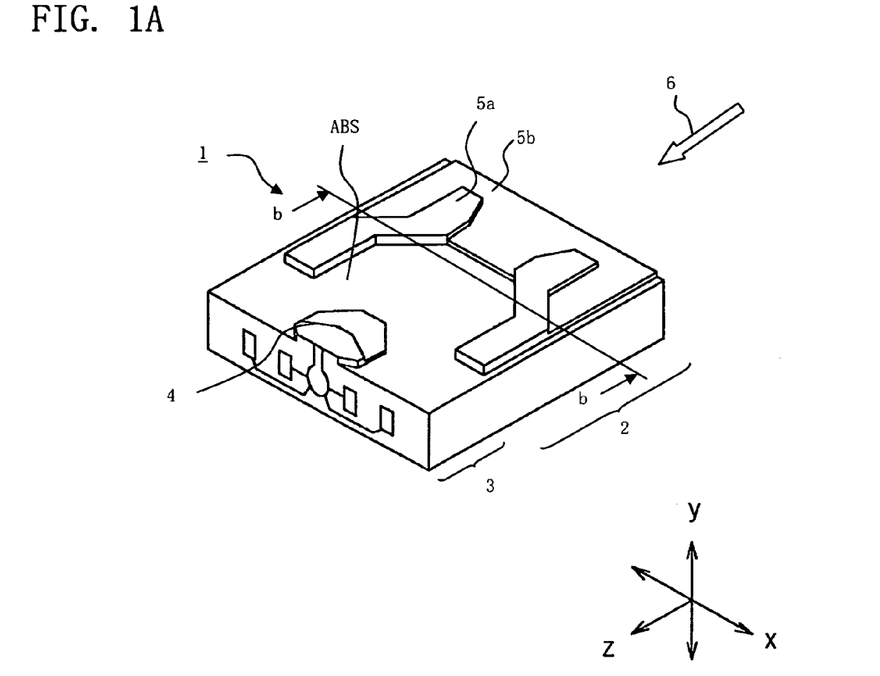
FIG. 1A is a perspective view of a slider related to a method for manufacturing a slider of the present invention.
Figure 1B:
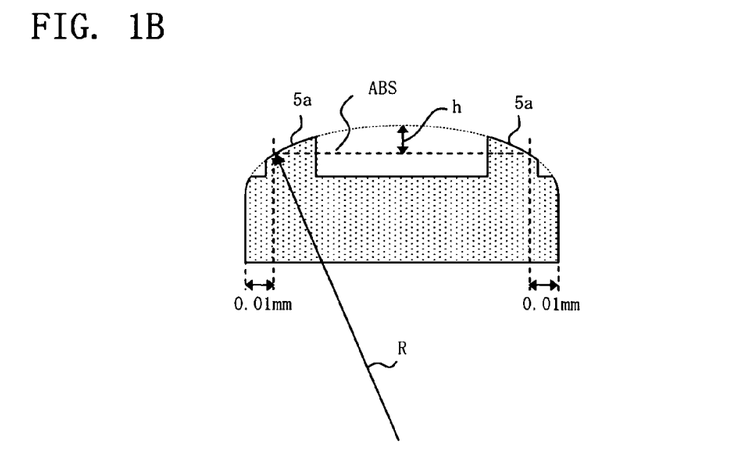
FIG. 1B is a sectional view of the slider along line b-b of FIG. 1A.
Figure 2:
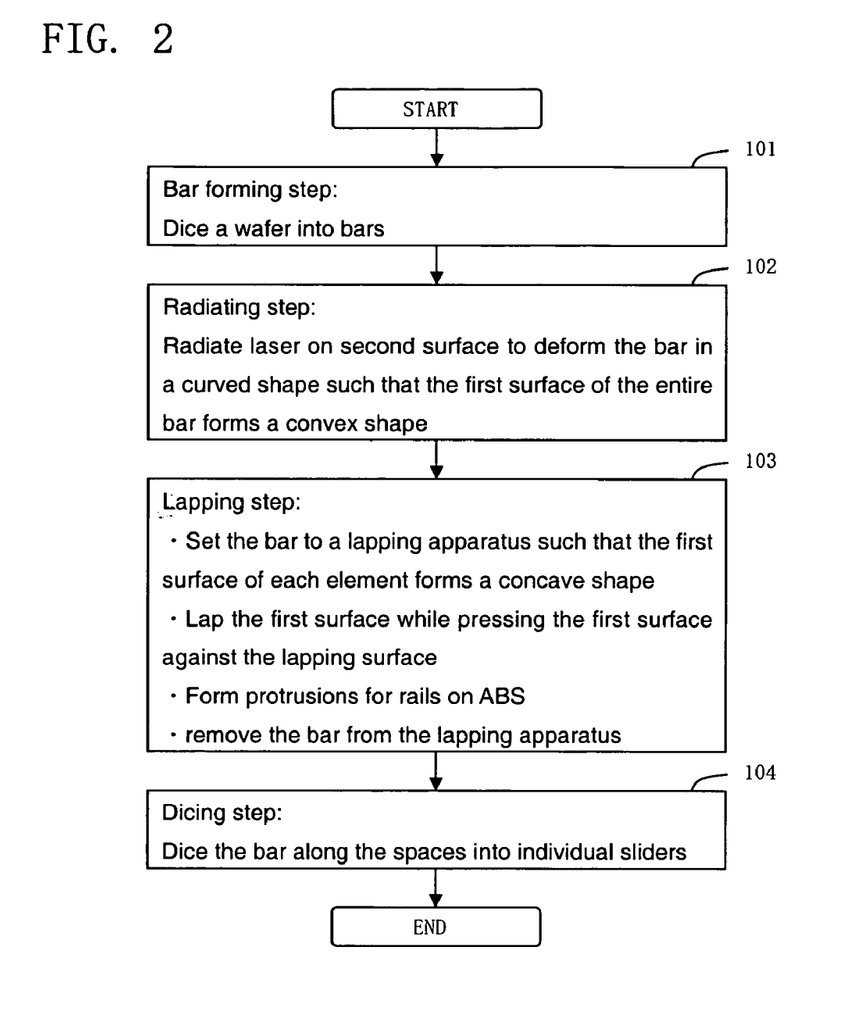
FIG. 2 is a flow chart showing the method for manufacturing a slider of the present invention.

A method for manufacturing a slider according to the present invention will be described in detail with reference to the attached drawings. FIG. 1A shows a perspective view of a slider which is manufactured by the method for manufacturing a slider of the present invention. FIG. 1B shows a sectional view of the slider. As shown in FIG. 1A, a slider 1 comprises a substrate 2 that is made of ceramic material, such as $Al_2O_3.TiC$, and a thin film magnetic head element 3 having a stacked structure. Disciform recording medium that is rotationally-driven, not shown, is positioned above (or below) the slider 1. The slider 1 has a substantially hexahedral shape, and one of the six surfaces of the slider 1 forms an ABS, which is positioned opposite to the recording medium. On the ABS, the thin film magnetic head element 3 has a read/write portion 4 which is provided with a write head portion and a read head portion. The substrate 2 is provided with rail portions 5a, 5b. The read head portion may be any element for detecting magnetic field that uses magneto-resistance effect, such as an anisotropic magneto-resistance (AMR) element, a giant magneto-resistance (GMR) element, or a tunneling magneto-resistance (TMR) element (also referred to as an MR element hereafter). The write head portion may be an inductive electromagnetic transducer. The write head portion may be a longitudinal recording type in which data is recorded in an in-plane direction of the recording medium or a perpendicular recording type in which data is recorded in an out-of-plane direction of the recording medium.

When the recording medium rotates, air enters from airflow inlet side 6 of slider 1 and exits slider 1 at an edge portion on the downstream side of the slider 1 with regard to rotating direction z of the recording medium. The edge portion is provided with the thin film magnetic head element 3. Specifically, air enters a slight gap between the rail portion 5b and the recording medium, and is adjusted by the rail portions 5a, 5b. Then the air enters the gap between the read/write portion 4 and the recording medium. The airflow generates downward lift in the y direction, which makes the slider 1 fly off the surface of the recording medium.

On the ABS, the rail portion 5a projects by the largest amount toward the recording medium, and the read/write portion 4 projects toward the recording medium with a recession of 1 to 3 nm relative to the rail portion 5a. The stepped portion between the rail portion 5a and the rail portion 5b may be omitted. FIG. 1B is a sectional view taken along the line b-b in FIG. 1A. The ABS has a camber with curvature R in a plane that includes the width direction (the direction that is orthogonal to the airflow inlet direction). The camber has a convex surface having the top at its center. Although FIG. 1B emphasizes the curve of the camber, the actual curvature is larger. The Curvature R is typically set at 6 meters or more. Although not shown, a crown having a convex surface with the top at its center is formed in a plane that includes the longitudinal direction (the airflow inlet direction) of the slider 1.

Next, a description will be given about the method for manufacturing the slider described above with reference to the flow chart in FIG. 2 and FIGS. 3A to 7.

(Step 101: Bar forming step)

Figure 3A:
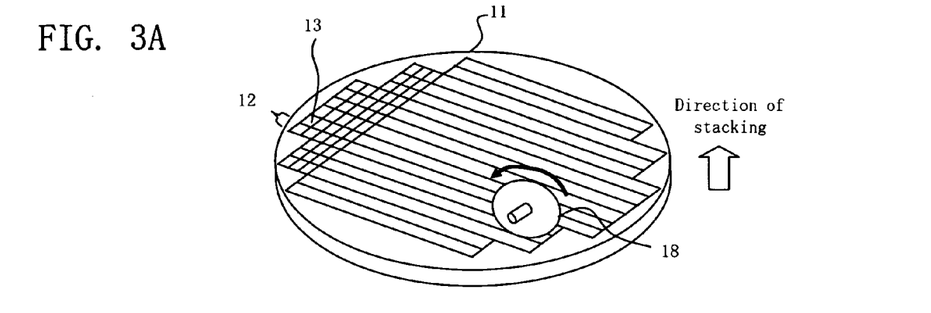
FIG. 3A is an external view of a wafer.

First, the wafer 11 having the elements 13 that are to be formed into the sliders 1 and that are formed by a thin film process is prepared. FIG. 3A shows a schematic view of a wafer viewed from the upper side of the direction of the stacking of the thin film magnetic head elements (indicated by the white arrow in FIG. 3A). The wafer 11 has many elements 13 which are two-dimensionally formed on a substrate made of silicon or the like. The wafer 11 is diced into the long bars 12 with the grindstone 18 such that the elements 13 are arranged in a line in the longitudinal direction.

Figure 3B:
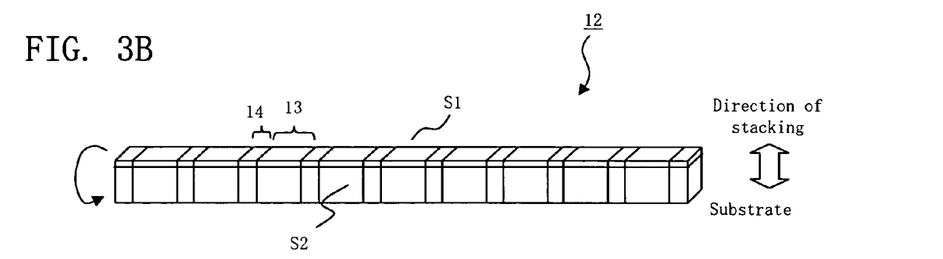
FIGS. 3B and 3C are external views of a bar.
Figure 3C:
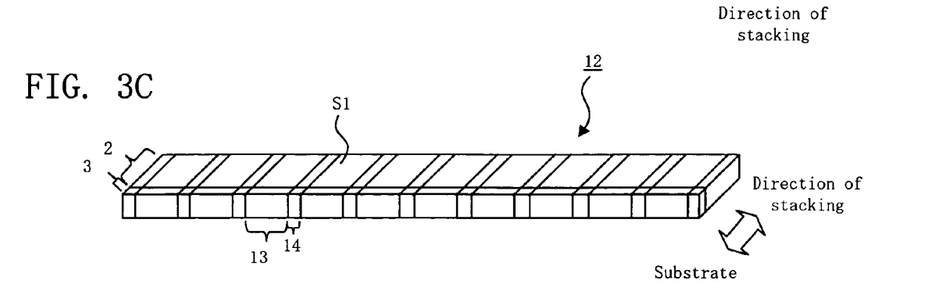

FIG. 3B is a perspective view of a bar that is formed by dicing a wafer, viewed, similarly to FIG. 3A, from the upper side of the direction of the stacking (indicated by the white arrow in FIG. 3B). The wafer 11 is diced such that the first surface S1, which is to be formed into air bearing surface ABS, appears on the dicing surface. FIG. 3C shows a perspective view of the bar when viewed such that the first surface S1 appears on the upper side, or the state in which the bar is turned in the direction of the arrow in FIG. 3B. The bar 12 has elements 13, which are formed into sliders, and spaces 14 for dicing that are alternately arranged. The space 14 for dicing are used when the bar 12 is diced into individual sliders 1 after the first surface S1 of bar 12 is lapped and the air bearing surface ABS is formed.

The space 14 for dicing may be provided with a resistive film, not shown, that is formed thereon. The resistive film, which is a sensor film called an RLG or an ELG, is lapped simultaneously with the first surface S1 so that the electric resistance of the film changes. The depth of the MR element that is measured perpendicularly to and from the air bearing surface ABS and called an MR height, can be adjusted to a predetermined value by monitoring the electric resistance value and thereby controlling the amount of lapping of the first surface S1.

In this step, the first surface S1 of the bar 12 may be lapped as needed. However, since the lapping in this step is not final, the amount of lapping is smaller than the amount that is required for forming the predetermined MR height. Furthermore, the backside of the first surface S1 (referred to as the second surface S2 hereafter), which is bonded to a flexure when assembling the slider into a head gimbal assembly, may also be lapped.

(Step 102: Radiating step)

Figure 4A:
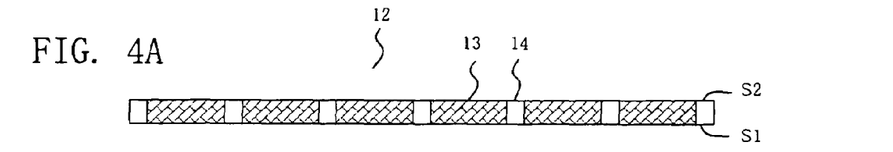
FIGS. 4A to 4G are step diagrams showing the radiation process and the subsequent dicing process.

FIGS. 4A to 4G are step diagrams showing the radiating process and the subsequent dicing process. FIGS. 4A to 4G are side views from the side of the bar (a direction showing the thickness of a bar). In each figure, the number of elements that are depicted is smaller than the actual number. As shown in FIG. 4A, the bar 12 has a substantially flat rectangular parallelepiped shape before radiation. The bar 12 is attached to a proper jig, not shown.

Figure 4B:
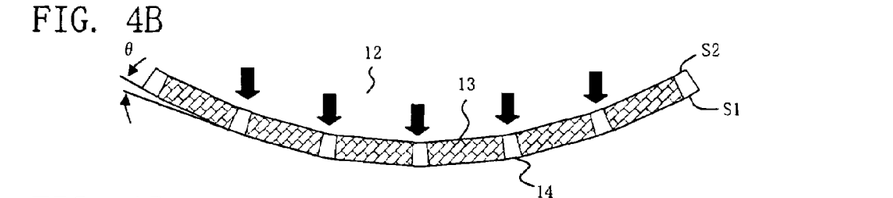

Next, as shown in FIG. 4B, laser (shown by the black arrows in FIG. 4B) is radiated on each space 14 of the second surface S2 that is sandwiched by the elements 13. In FIG. 4B, all the spaces 14 are simultaneously irradiated. However, each of the spaces 14 may be sequentially irradiated, or more than one or all of the spaces 14 may be simultaneously irradiated.

Figure 5A:
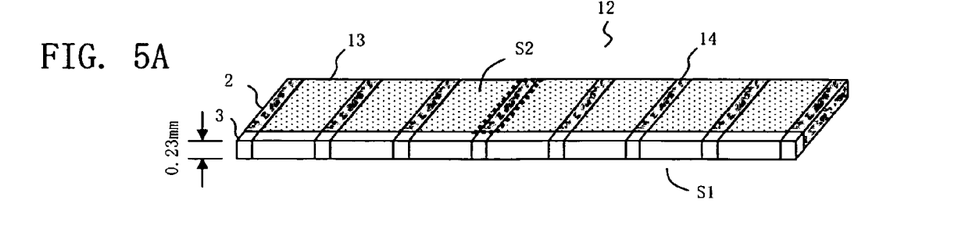
FIGS. 5A and 5B are conceptual diagrams showing an example of the irradiated area.
Figure 5B:
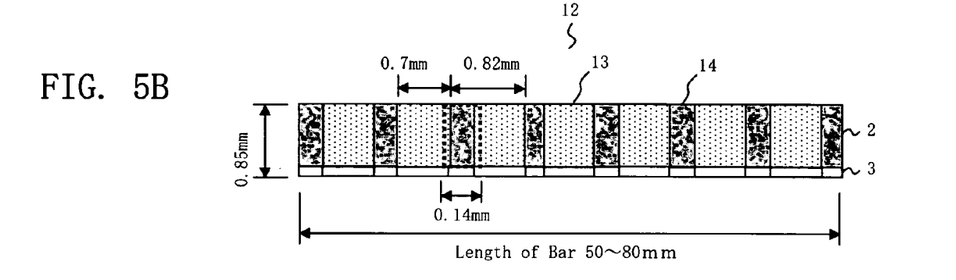

FIGS. 5A, 5B are conceptual and exemplary diagrams showing the irradiated area. FIG. 5A is a perspective view and FIG. 5B is a plan view of the second surface. Dimensions of each part of the bar are also shown in FIGS. 5A, 5B. In this example, the width of the element 13 is 0.7 mm, the width of space 14 is 0.12 mm, and the arrangement pitch of a pair of the element 13 and the space 14 is 0.82 mm. Laser is radiated on the entire width of the space 14 and the width of 0.01 mm of the elements 13 on both sides of the space 14 (see the broken line area in each diagram). After all the spaces 14 is irradiated, the entire shape of the bar 12 is changed to a curved shape such that the first surface S1 forms a convex surface, as shown in FIG. 4B.

Figure 6A:
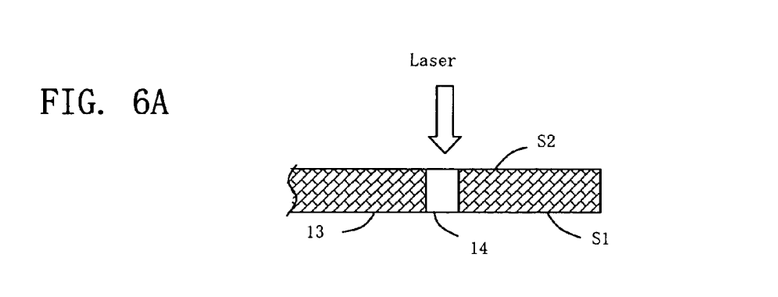
FIGS. 6A and 6B are conceptual diagrams showing the mechanism of bending of the bar.
Figure 6B:
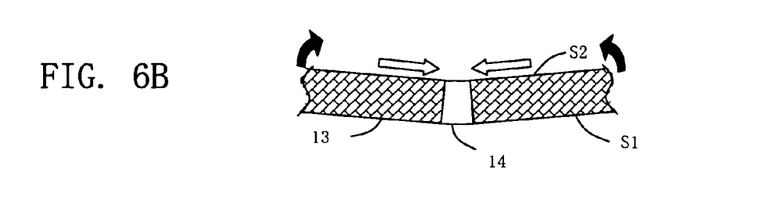

FIGS. 6A, 6B are conceptual diagrams illustrating the mechanism of the bending of the bar. When the laser is radiated on the space 14 from the side of the second surface S2, as shown in FIG. 6A, compressive stress is caused on the side of the second surface S2. As a result, the irradiated area on the side of the second surface S2, which is nearly equal to the space 14 in the example of FIGS. 5A, 5B, shrinks, as shown in FIG. 6B. The degree of shrinkage is largest at the second surface S2, and decreases in accordance with the depth from the second surface S2. The elements 13 on both sides of the space 14 that is irradiated are pulled by the space 14 that shrinks (see the white arrows in FIG. 6B) so that the distance between both elements 13 becomes the smallest at the second surface S2 (see the black arrows in FIG. 6B). In this way, such a curved shape is formed.

The wavelength of laser is preferably in the range of about 200 to 3000 nm. The amount of the laser radiation depends on the circumstance in which the bar is placed. In other words, the amount when the radiation is performed in gas differs from the amount when the radiation is performed in liquid, such as purified water. Approximately 0.1 to 1.5 $mJ/mm^2$ is a desirable value when the radiation is performed in gas, and approximately 0.1 to 4.0 $mJ/mm^2$ is a desirable value when the radiation is performed in liquid. If the amount of the laser radiation is less than the lower limit, a desirable deformation of the bar can not be obtained. If the amount of the laser radiation exceeds the upper limit or the energy is too high, the bar itself, the write head portion or the read head portion may be damaged (broken). The upper limit of the amount of the laser radiation is higher for the radiation performed in liquid, because the temperature rise of the bar is limited as compared with the radiation performed in gas. Therefore, the degree of deformation of the bar can also be increased compared with the radiation performed in gas. The amount of the laser radiation can be determined within the range mentioned above, taking into account the material of the bar, residual stress in the bar, which varies depending on the surface roughness of the first and second surfaces and lapping methods etc., the dimension of the bar, such as the thickness, time and a number of the laser radiation (number of scanning) and so on.

Since a laser is radiated in order to bend a bar, any electromagnetic wave other than the laser can be used, as long as the desired curved shape can be formed. The area of radiation can be adjusted according to the wavelength and the amount of radiation of laser. Specifically the laser may be radiated on the entire surface or on a part of the surface of the space 14, and the laser may be or needs not to be radiated on a part of elements 13 that are adjacent to space 14, as described above. It is desirable to prevent radiating laser on thin film magnetic head element 3 in order to avoid any damages on it. It is not necessary to radiate laser on the spaces on both ends of the bar 12. Under these conditions, the bending angle θ (see FIG. 4B) of about 0 to 0.004° is obtained for a pair of an element and a space in an embodiment described later. Therefore, even if the bar has 100 elements formed thereon, the entire bending angle is about 0.4° at maximum. It should be noted that the bending of the bar is emphasized in FIGS. 4B, 4F.

(Step 103: Lapping step)

Figure 7:
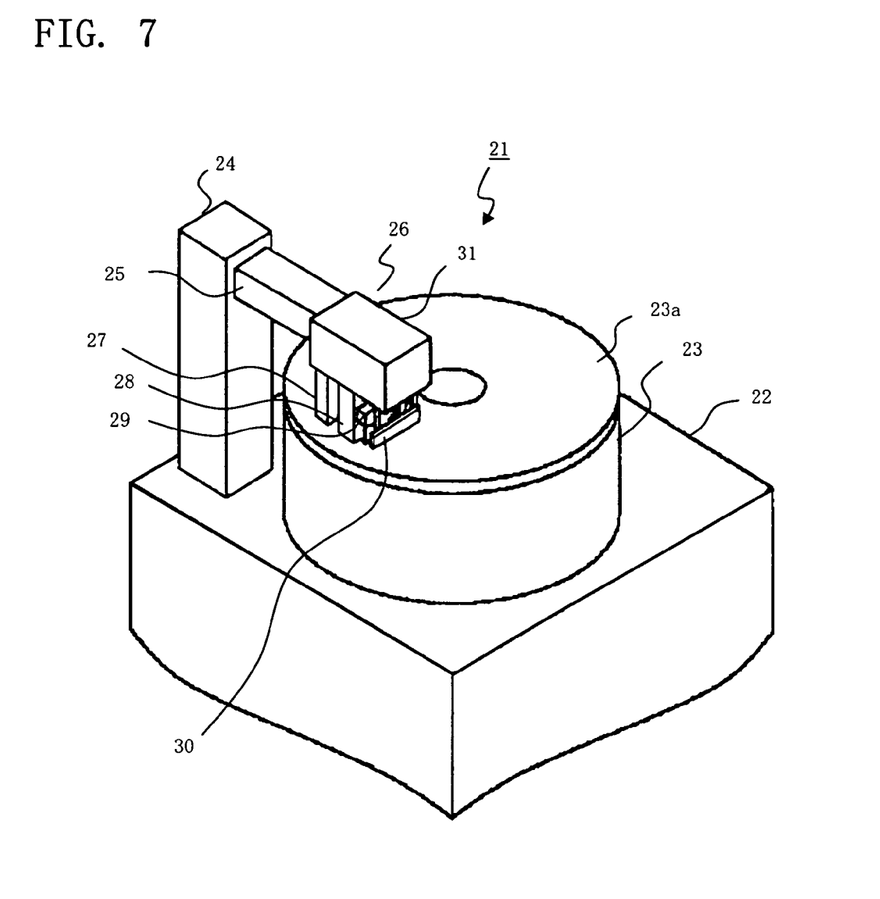
FIG. 7 is a perspective view showing a schematic configuration of a lapping apparatus.

Next, the first surface S1 is lapped while the bar 12 is pressed against a lapping surface. First, a lapping apparatus used for lapping will be described. FIG. 7 is a perspective view showing a schematic configuration of lapping apparatus. A Lapping apparatus 21 comprises a table 22, a rotatable lapping table 23 provided on the table 22, a support column 24 that is provided adjacent to the rotatable lapping table 23, an arm 25 that projects over the rotatable lapping table 23 from the support column 24, and a bar supporting portion 26 that is mounted on the arm 25. The rotatable lapping table 23 has a lapping surface 23a on which the bar 12 is lapped. The Lapping surface 23a is formed, for example, by embedding diamond abrasives on the surface of a circular disk made of Sn (tin). The bar supporting portion 26 has a main body 27 that is coupled to the arm 25, a base member 28 that is provided in front of the main body 27, and a jig holder 29 that is provided in front of the base member 28. The base member 28 is coupled to an actuator (not shown) via an arm (not shown) to be vertically movable by driving the actuator. The actuator is provided in the main body 27. The Jig holder 29 is configured to hold a lapping jig 30 to which holds the bar 12 is attached. The lapping jig 30 may be made of SiC, stainless steel, zirconia ($ZrO_2$), and ceramics, such as alumina ($Al_2O_3$). The Bar supporting portion 26 is further provided with load adjusting portions, not shown. The load adjusting portions press the bar 12 against the lapping surface 23a via the lapping jig 30 at locations along the longitudinal direction of the bar 12. The load adjusting portions are preferably arranged at the same intervals as possible. The upper portions of the main body 27, the base member 28, and the jig holder 29 are covered with a cover 31.

Figure 4C:
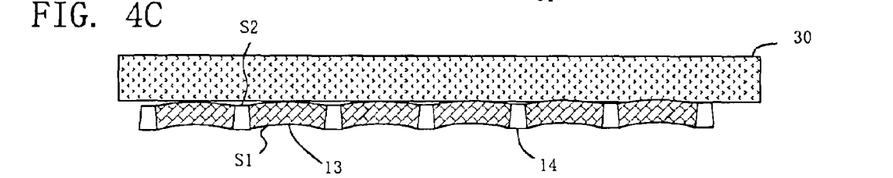

A bar is lapped in accordance with the following steps. First, the bar 12 is fixed to the lapping jig 30. Specifically, the second surface S2 of the bar 12 is bonded to the lapping jig 30 with an adhesive. Since the bar 12 is very thin and flexible, the entire curved shape of the bar 12 follows the flat shape of the lapping jig 30, and is easily modified to a flat shape, as shown in FIG. 4C. As a result, the first surface S1 of each of elements 13 forms a concave shape.

Figure 4D:
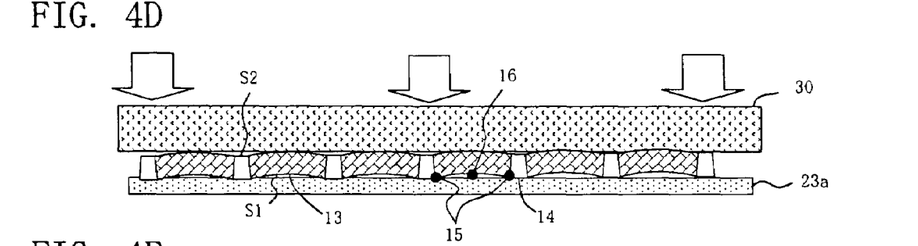

Next, as shown in FIG. 4D, the lapping jig 30 to which the bar 12 is mounted is set on the lapping apparatus 21 such that the first surface S1 is positioned opposite to the lapping surface 23a. It is desirable that the lapping jig 30 is set such that the load adjusting portions are positioned above the spaces 14 of the bar 12. The positions of the load adjusting portions are indicated by the white arrows in FIG. 4D. Since the lapping jig 30 is set parallel with the lapping surface 23a, each second surface S2 of the spaces 14 is held at an approximately same distance measured from the lapping surface 23a in the direction perpendicular to the lapping surface 23a.

Figure 4E:
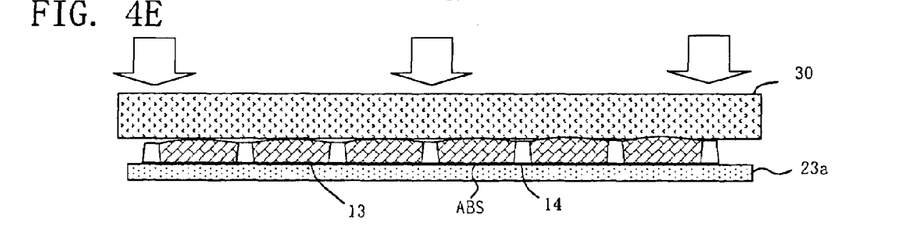

The bar 12 is pressed in this state against the lapping surface 23a in order to lap the first surface S1. Since the first surface S1 of each of the elements 13 is concave, only the end portions 15 on both sides of element 13 (or the vicinity thereof) with regard to the longitudinal direction of elements 13 (longitudinal direction of the bar) are in contact with the lapping surface 23a. Therefore, only the end portions 15 are lapped first. As the lapping further progresses, the area of lapping gradually expands toward the central portion 16, and finally the entire surface of the first surface S1 is lapped to form the air bearing surface ABS, as shown in FIG. 4E. The amount of lapping is controlled by monitoring change in electric resistance of the aforementioned resistive film.

Figures 4F, 4G:
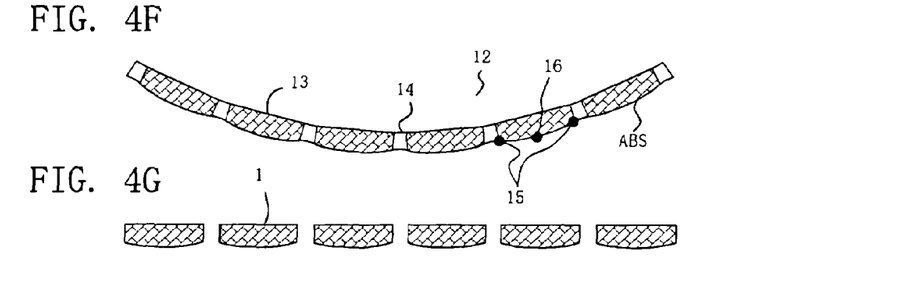

When the lapping is finished, the protrusion of the rails is formed on air bearing surface ABS by milling etc. Next, the bar 12 is removed from the lapping jig 30, as shown in FIG. 4F. Since the bar 12 is released from the constraint of the lapping jig 30, the bar 12 returns to a curved state. As described above, only both end portions 15 of each element 13 are lapped first, and finally the central portion 16 is lapped. Therefore, both end portions 15 are lapped by the largest amount and the central portion 16 is lapped by the smallest amount. In this way, a camber is formed on each element 13.

(Step 104: Dicing step)

The Bar 12 is diced along the spaces 14 into the sliders 1 while the bar 12 is held with a dicing jig, not shown, as shown in FIG. 4G. A grindstone is used to dice the bar 12. Thereafter, the sliders 1 are cleaned and removed from the dicing jig.

Next, an example of the present invention will be described. The laser beam having a wavelength of 1064 nm was radiated on the bar 12 that is shown in FIGS. 5A, 5B. The area of laser radiation was the space 14 and a part of elements 13 having a width of 0.01 mm on both sides of the space 14, as shown in FIGS. 5A, 5B. The peak height h and the curvature R of the camber were measured taking the amount of radiation as parameters. As shown in FIG. 1B, the peak height h was defined by the line that connects the positions that were 0.01 mm apart from both sides of the element (slider) toward the center. Table 1 shows the results.

TABLE 1

| Sample No. | Amount of Radiation ($J/mm^2$) | Peak Height h (mm) | Curvature R (m) |
|---|---|---|---|
| 1 | 0.35 | 0.5 | 63 |
| 2 | 0.42 | 1.5 | 21 |
| 3 | 0.49 | 2.5 | 13 |
| 4 | 0.60 | 6.0 | 6 |

Thus, it can be understood that cambers of different peak heights and curvatures can be formed according to the present invention. It can also be understood that the peak height and the curvature can be adjusted by changing the amount of radiation and thereby controlling the degree of shrinkage of the second surface of the space for dicing.

Finally, the effects of the present invention will be summarized. First, according to the present invention, the area that is irradiated with laser is limited to the spaces that are finally eliminated through dicing, and most part of the elements are not irradiated. The present invention is completely different from such a method as disclosed in Patent Document 1 in which laser is directly radiated on the elements Theoretically, deterioration of the reliability of shape stability of a camber, which is mentioned above in relation to Patent Document 1, does not occur. Further, since the point that is irradiated with laser can be controlled with high accuracy, laser is accurately radiated on the space even if the space is small. Accordingly, the present invention can easily be applied to miniaturized sliders compared with the mechanical methods disclosed in Patent Documents 2, 3, and 6. Additionally cambers having different peak heights and curvatures can be formed by adjusting the wavelength and the amount of radiation of laser (the amount of radiation can be controlled by energy, the size of the beam, and radiating position of the beam). Therefore, adjustments can easily be made in accordance with design requirements of a slider, such as dimensions and flying height. In other words, there is no need to prepare any jigs just to make the shape of a chamber and lapping apparatus just to machine the shape of a camber, as in the method described in Patent Documents 3, 4, and 5, and therefore, higher productivity can be obtained. Although a certain preferred embodiment of the present invention has been shown and described in detail, it should be understood that various changes and modifications may be made without departing from the spirit or scope of the appended claims.

What is claimed is:

1. A method for manufacturing sliders from a bar, wherein elements and spaces are alternately arranged in said bar, said elements being formed into said sliders, and said spaces being used to dice said bar into said sliders, the method comprising:

a radiating step which includes radiating an electromagnetic wave on at least a part of each space on a second surface of said bar, wherein said second surface is a back surface of a first surface of said bar, said first surface being formed into an air bearing surface of said slider, wherein said space is sandwiched between said elements, and wherein said electromagnetic wave is radiated such that an entire portion of said bar forms a curved shape such that said first surface forms a convex surface;

a lapping step that is performed after the radiating step, the lapping step including lapping said first surface while pressing said bar against a lapping surface such that said first surface of each element forms a concave shape; and a dicing step that is performed after the lapping step, the dicing step including dicing said bar along said spaces to separate said bar into said sliders.

2. The method according to claim 1, wherein said electromagnetic wave is laser.

3. The method according to claim 2, wherein said electromagnetic wave is the laser having a wavelength between 200 and 3000 nm.

4. The method according to claim 3, wherein said laser is radiated on said bar that is located in gas with an amount of radiation between 0.1 and 1.5 mJ/mm$^2$.

5. The method according to claim 3, wherein said laser is radiated on said bar that is located in liquid with an amount of radiation between 0.1 and 4.0 mJ/mm$^2$.

6. The method according to claim 1, wherein the lapping step includes pressing said bar against said lapping surface while holding said second surface of said bar at a plurality of locations, the plurality of locations being positioned along a longitudinal direction of said bar, wherein said second surface is held at said locations at an approximately same distance, the distance being measured from the lapping surface in a direction perpendicular to said lapping surface.

7. The method according to claim 6, wherein the plurality of locations are said spaces.

* * * * *